United States Patent [19]

Sanders

[11] Patent Number: 4,879,027

[45] Date of Patent: Nov. 7, 1989

[54] BINARY FLUID SYSTEM, AND COMPONENTS THEREOF, FOR PRODUCING AN IMPREGNATED METERED FLUID STREAM

[75] Inventor: John T. Sanders, Thousand Oaks, Calif.

[73] Assignee: A. W. Schlottmann, Thousand Oaks, Calif.

[21] Appl. No.: 161,200

[22] Filed: Sep. 18, 1987

Related U.S. Application Data

[63] Continuation-in-part of Ser. No. 34,062, Apr. 2, 1987, abandoned.

[51] Int. Cl.[4] ............................................. E04H 3/16
[52] U.S. Cl. .................................. 210/123; 210/169; 210/195.1; 210/198.1; 422/256; 141/374
[58] Field of Search .................. 210/169, 195.1, 205, 210/416.2, 198.1, 192, 206, 220, 754, 756, 123; 137/205.5, 592; 422/256; 141/374

[56] References Cited

U.S. PATENT DOCUMENTS

| | | | |
|---|---|---|---|
| 482,583 | 9/1892 | Metz | 210/296 |
| 2,024,830 | 12/1935 | McCann | 423/421 |
| 2,043,710 | 6/1936 | Rowland | 423/421 |
| 2,150,437 | 3/1939 | Gilbert | 210/198.1 |
| 2,714,963 | 8/1955 | Lester et al. | 210/198.1 |
| 2,984,250 | 5/1961 | Foster et al. | 137/564.5 |
| 3,672,508 | 6/1972 | Simon | 210/169 |
| 4,067,808 | 1/1978 | Phillips | 210/169 |
| 4,303,515 | 12/1981 | Rademacher | 210/169 |
| 4,333,833 | 6/1982 | Longley et al. | 210/754 |
| 4,363,728 | 12/1982 | Gugliemi et al. | 210/169 |
| 4,381,240 | 4/1983 | Russell | 210/169 |
| 4,419,233 | 12/1983 | Baker | 210/198.1 |

Primary Examiner—Richard V. Fisher
Assistant Examiner—Coreen Y. Lee
Attorney, Agent, or Firm—M. Ralph Shaffer

[57] ABSTRACT

A binary fluid system, and components thereof for producing an impregnated metered fluid stream. Broadly, a container is included in the system and contains upper and lower, first and second fluid phases, i.e., liquids, gases or a combination of the same, which fluid phases meet at a common, unobstructed horizontal boundary or junction, extending the cross sectional width of the container. The fluid phases are of differing density, molecular weight, or specific gravity with the lighter phase being on top. Plural means are coupled to the container for replenishing both of the phases and also for drawing off, at a metered flow rate, the first or upper phase as impregnated by said second phase through diffusion processes across the common phase boundary, the withdrawal being from the container at the volumetric position of the first phase and proximate and above such phase boundary. The invention has special application to recirculating systems as may accommodate swimming pools, by way of example.

24 Claims, 1 Drawing Sheet

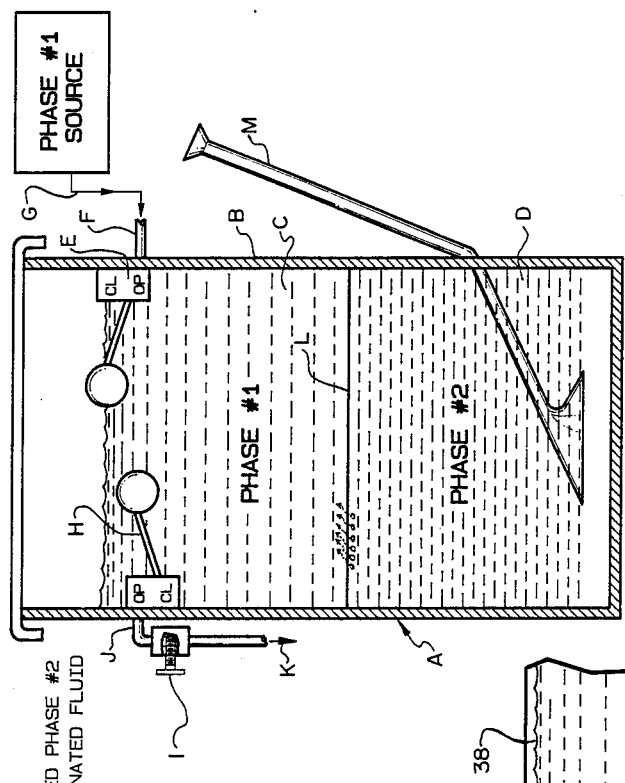
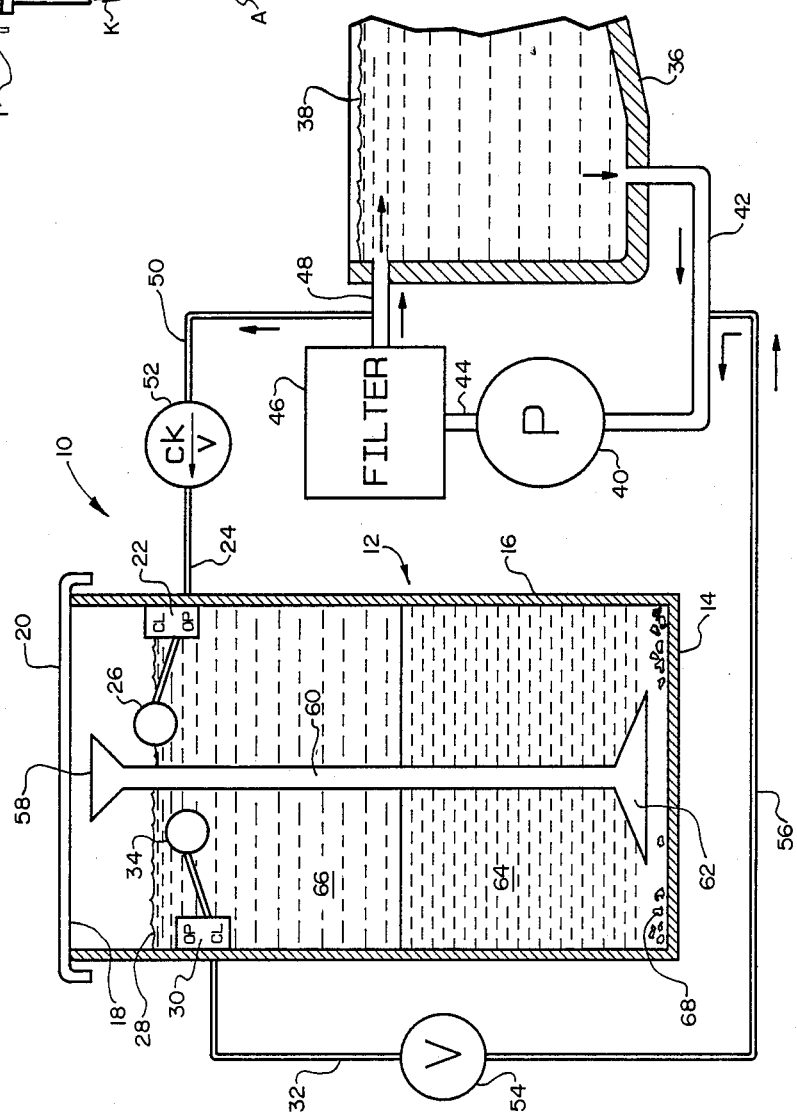
Fig. 1
Fig. 2

4,879,027

BINARY FLUID SYSTEM, AND COMPONENTS THEREOF, FOR PRODUCING AN IMPREGNATED METERED FLUID STREAM

This is a continuation-in-part of copending patent application entitled SWIMMING POOL CHLORINATOR, by the same inventor, Ser. No. 07/034,062, filed Apr. 2, 1987, now abandoned.

FIELD OF INVENTION

The present invention relates to binary fluid systems and, more particularly, to such a system utilizing across-boundary dispersion for impregnating a first phase of the binary system and drawing the same off for appropriate utilization in a metered flow condition. The invention also comprehends the utilization of the present binary fluid system in a variety of arts, whether or not the same involve circulation or recirculation branches.

BACKGROUND OF INVENTION AND BRIEF DESCRIPTION OF PRIOR ART

The central problem that is addressed by this invention is that of advantageously providing an impregnated fluid stream, metered as to flow rate, for use in a variety of contexts. The production of admixtures of liquids, gases, or a combination of the same, can be troublesome and somewhat expensive. In the past there have been a variety of ways in which this central issue has been addressed. The present invention departs from prior approaches to the problem by utilizing a multi-phasal approach wherein two fluids have a common boundary or juncture such that dispersion across said boundary can be taken advantage of so as to impregnate a fluid in a manner suitable for draw-down and use. Experience with Brownian movement has demonstrated the well-recognized and accepted principle that, for both liquids and gases, there is no quiescent state of matter; rather, molecules in both types of fluids have a substantial kinetic energy and move from place to place. The distance between molecular collisions in liquids, otherwise known as "mean-free path," is small when compared to mean-free path as to gases. In any event, this kinetic energy and the consequential molecular movement is useful, the inventor has found, in impregnating an upper liquid by the substance, components or ions of a lower and heavier liquid enjoying a common boundary with the former liquid. The same applies for gases. Even though gases, especially the lighter gases are said to be miscible, yet for the heavier gases there will be some stratification and some delay in total dispersion of one gas through the other. This can be taken advantage of in impregnating the upper gas with the lower heavier gas for draw-down as circumstances warrant. In a particular application, a fundamental thrust of the invention is in the maintenance of hygienic water in a swimming pool wherein chlorine or another halogen is employed as a sterilizing agent. Halogens are, of course, the five elements, fluorine, chlorine, bromine, iodine and astatine forming group 7A in the periodic table. These exist, of course, in a free state normally as diatomic molecules. Various types of chemicals are extant and readily available for use. These are all biocides and can be used essentially detoxifying by biocidal action swimming pool water, waste effluent, and so on. As to one use of the invention, i.e., the treatment of swimming pool water, chlorine remains a preferred sterilizing agent.

In order to limit the growth of bacteria and algae in swimming pool water, to maintain hygienic water in the pool, chlorine is conventionally used as the sterilizing agent. In professionally maintained pools, gaseous chlorine is used as the sterilizing agent. Gaseous chlorine is cheap, but is toxic, and thus is not generally distributed to the public for use in their swimming pools.

Chlorine remains the preferred sterilizing agent, but is supplied to the custodians of small pools in forms where it is combined with other material so that the chlorine is released when the compound is placed in the swimming pool. Several solid compounds are available, but each has a disadvantage. The most commonly employed material in the sterilization of swimming pools is sodium hypochlorite in about 90 percent water solution. One of the disadvantages of this material is that the release of chlorine is too fast, with a consequence that the amount of dissolved chlorine in the swimming pool declines due to dissipation of free chlorine from the pool surface. When the sodium hypochlorite solution is poured directly into the pool, there is no reserve to further supply chlorine to the pool water. Another disadvantage of the employment of a water solution of sodium hypochlorite as the supplier of chlorine to the swimming pool water is that one of the dissociation products is sodium chloride. This sodium chloride eventually builds up in the pool water until the pool water has a salty taste and must be changed.

Thus, there is need for a swimming pool chlorinator which employs the conveniently available water solution of sodium hypochlorite as the source of chlorine, but which provides ongoing release of the water solution of chlorine gas to the pool, together with means for retaining a substantial amount of sodium chloride separate from the pool water. It will be understood that rather than using sodium hypochlorite, any one of a number of chemicals can be employed for the treatment of swimming pool water as, for example, such as any one of a number of halide salts that can be in combination with sodium, for example. There are likewise calcium salts in connection with the above-designated halogens.

As to the basic concept of utilizing diffusion to provide a metered, impregnated outflow, no applicable art is now known to the inventor. In connection with swimming pool maintenance, however, the following U.S. Pat. Nos. are known: 4,303,515, 2,984,250, 4,333,833, 3,672,508, 4,363,728, 4,067,808, 4,381,240.

U.S. Pat. No. 2,984,250 teaches a water treatment system, relying, not upon a cross-boundary diffusion as in the present invention, but rather upon the use of a membrane between main-line water and a chemical solution that is employed.

U.S. Pat. No. 3,672,508 teaches a swimming pool chlorinator wherein an injection system is employed to introduce chlorine into the pool. The chlorine tank employed had a float valve.

U.S. Pat. No. 4,067,808 teaches a chlorinator for a swimming pool but where a physical solid separator is employed in the tank, and wherein chlorine introduction is based upon the weight of the water above the separator in forcing the chlorine solution downwardly and from there upwardly through a stand pipe.

U.S. Pat. No. 4,303,515 indicates a standard chemical dispenser employing chlorination tablets in combination with a water injection system.

U.S. Pat. No. 4,333,833 simply indicates an in-line disinfectant contactor having a side ranch chlorinator.

U.S. Pat. No. 4,363,728 teaches the employment of an automatic chlorinator for swimming pools; however, no diffusion principle is employed therein.

U.S. Pat. No. 4,381,240 indicates a swimming pool conditioning system wherein a manifold is employed to collect chlorine gas liberated by electrolysis whereby to introduce chlorinated water back to a swimming pool.

In none of these patents is there taught the principle of utilizing diffusion across the common unobstructed boundary of two fluids for impregnating an upper fluid of lower density, specific gravity, or molecular weight whereby to draw off a metered flow of such impregnated fluid for future use, whether for swimming pools or otherwise.

BRIEF DESCRIPTION OF PRESENT INVENTION

The fundamental inventive concept herein regardless of the art or context in which the concept is utilized, is the production of a binary fluid system provided a container having upper and lower, first and second fluid phases, meeting at a common, unobstructed, horizontal boundary or juncture, the same being horizontal and extending for the entire cross-sectional width of the container. The fluid phases are of differing molecular weight, density, or specific gravity, with the heavier fluid being constituting the bottom phase and the lighter fluid the upper phase. Either or both phases may be liquids, gases, or a combination of the same. Structure is coupled to the container for replenishing the first phase, also the second phase, and also drawing off the upper phase when impregnated by meandering elements, particles, ions, or the like which traverse the juncture upwardly to impregnate at least the lower portion of the lighter fluid phase in the container. Preferably float valves are used for regulating the maximum fluid level and also the fluid level below which the first phase will not be drawn down. Importantly, the outlet from the first phase for the impregnated fluid will be metered, as by the provision of an adjustable needle valve, for example, whereby to properly regulate volumetric flow of the fluid to thereby regulate the enrichment of any larger body of fluid in which the impregnated fluid is to be introduced. As above described, it will be recognized that the invention will be useful in a variety of arts, such as anesthesiology, water treatment, the petrochemical industry, treatment of affluents, and all areas where biocidal action is to be brought about. It will likewise be applicable to various function of scrubbers and charging of particulates of various exhaust systems for future for heavy metal collection, by way of example. In one specific embodiment of the invention, relative to swimming pool treatment, it can be stated in an essentially summary form; to wit:

In order to aid in the understanding of this invention, it can be stated in essentially summary form that it is directed to a swimming pool chlorinator wherein a separation tank is connected for circulation therethrough of swimming pool water. The tank has a distributor therein for non-turbulently delivering a water solution of sodium hypochlorite into the bottom of the separation tank with the circulation of pool water passing above the sodium hypochlorite solution. The rate of flow of pool water through the separation tank may be controlled and one or more float valves and/or other means which may be provided to prevent drainage of the swimming pool water in the separation tank into the swimming pool when the pool circulation pump is turned off.

OBJECTS

Accordingly, a principal object of the present invention is to provide a binary fluid system utilizing lighter and heavier fluids meeting at a common boundary and elemental dispersion across said boundary for impregnating the lighter fluid whereby to draw off, in metered flow, such impregnated fluid for useful advantage.

A further object is to provide a binary fluid system utilizing the principle of dispersion for effecting a desired result.

An additional object is to provide a fluid dispersion system for use in any one of a number of arts and contexts, whether the context include circulating, recirculation, or other types of systems.

It is further object to provide for halogen treatment of one or more fluids, for effecting biocidal action in bodies of water or other fluids such as swimming pool water, public drinking water, and so forth.

It is thus an object and advantage of this invention to provide a swimming pool chlorinator which employs a water solution of sodium hypochlorite as the chlorine source, but which has a separation tank which separates the chlorine from the residual sodium chloride so as to minimize the amount of sodium chloride entering a swimming pool.

It is another purpose and advantage of this invention to provide a swimming pool chlorinator or similar treatment unit wherein a separation tank maintains separate bodies of materials in water solution by stratification so that gaseous chlorine in water solution is released from the lower body to the upper body and wherein the upper body is circulated into the swimming pool.

The features of the present invention which are believed to be novel are set forth with particularity in the appended claims.

The present invention, both as to its organization and manner of operation, together with further objects and advantages thereof, may be best understood by reference to the following description, taken in conjunction with the accompanying drawings in which:

BRIEF DESCRIPTION OF THE DRAWINGS

FIG. 1 is a diagrammatic front elevation of the basic system of the present invention useful in a variety of arts.

FIG. 2 is a schematic diagram of a swimming pool water circulation system, including a side elevation of a chlorinator or other mixing device, the near side of the separation tank of the chlorinator being broken away and the tank taken in section.

DETAILED DESCRIPTION OF PREFERRED EMODIMENTS

In FIG. 1 the basic system A provided a container B which includes first and second fluid phases C and D, otherwise identified as phase #1 and phase #2, respectively. Phase #1 is of lower density, specific gravity, and/or molecular weight than the lower phase #2. For example, phase #2 may be a 90% water solution of sodium hypochlorite, with phase #1 simply being pool water. In any event, there will be a suitable structure at E, such as a float valve, for regulating the maximum level of fluid within the tank. The inlet thereto at F is turned off once that level is reached. The inlet is coupled by line G to a phase #1 source. Correspondingly, there will be structure such as a float valve at H for regulating the minimum depth of liquid within the tank. Item I will comprise a metering device such as a hand-adjustable needle valve which connects to outlet J associated with valve H. Metering valve I meters the outlet K which produces an impregnated fluid from phase one which is impregnated by the boundary crossing of elements, e.g. particulates, ions, molecules, and so forth, serving to impregnate phase #1 by the constituency of phase #2. We noted that phase #1 and phase #2 may both comprise liquids, or gases, or phase #1 can comprise a gas and the latter to a liquid. This will depend upon the particular application. The important point is that molecular kinetic energy in phase #2, be the same liquid or gas, is useful to cause a dispersion upwardly through boundary L adjoining both of the fluids, whereby the ions, atoms, or whatever proceeding upwardly across the boundary will impregnate phase #1 such that an impregnated liquid is withdrawn at J. The degree of disturbance at boundary of junction L, as occasioned by the magnitude of fluid-flow from inlet F, via opening OP of float valve 2 in FIG. 2, into the tank and toward the junction L, will augment upward Brownian movement of ion migration across the junction L and thus enhance chlorination of phase #1. The valve or other structure at H may be positioned downwardly to be even more proximate the juncture, thereby, taking greater advantage of the dispersion above described. Correspondingly, the amount of fluid in phase #2 may be increased so as to move the boundary L closer to valve H.

There will also be supplied a suitable structure such as at M serving as simply a down spout or pipe whereby to introduce additional phase #2 material. In the case of swimming pool water treatment, the material including a suitable halogen will be introduced in the standpipe M, the latter being either inside the tank or outside thereof with sufficient height so as to avoid fluid loss. FIG. 2, indicates the system as employing a swimming pool chlorinator. The term "chlorinator" herein will be understood to be in the general sense, that is, whether a chlorine containing substance or another halogen containing substance is utilized relative to the second fluid phase at 64 in the drawing. For simplicity of discussion, the term "chlorinator" will be used throughout as describing the tank system at 12 regardless of the particular halogen salt used.

The swimming pool chlorinator of this invention is generally indicated at 10 in FIG. 2. The chlorinator includes a tank 12 which has a closed bottom 14, side walls 16 and an open top 18. Cover 20 is removably mounted on the open top to permit access to the open tank. The cover keeps dust and dirt out of the tank and substantially keeps chlorine fumes, if any, as a safety precaution, from escaping the tank.

Tank 12 is provided with an inlet float valve 22 to which is connected pressurized swimming pool water line 24. Inlet float valve 22 is provided with a float 26 which controls float valve 22 so that the valve is open when the water level in the tank is below a predetermined and is closed when the water level rises to the predetermined level. In this way, inlet float valve 22 maintains water level in the tank at the predetermined, i.e. maximum level as long as there is pressure in water line 24. The normal water level is indicated at 28. Outlet float valve 30 is connected to water outlet line 32. Outlet float valve 30 has a float 34 connected to the valve for controlling the valve. Valve 30 is arranged so that when float 34 descends, valve 30 is closed. Furthermore, the float is arranged so that the valve is closed before outlet line 32 is exposed by a falling water level. In this way, outlet liquid, e.g. water line 32 is always covered by water.

In its normal installation, chlorinator 10 is installed in connection with a swimming pool. A portion of swimming pool 36 is shown in FIG. 2. Swimming pool 36 contains water 38 to a point near its upper edge. In order to keep the water clean, circulating pump 40 draws water from the pool through suction line 42 and discharges it through pressure line 44 to filter 46. The filter removes suspended contaminants from the water, and the clean water is delivered to the pool through pressure line 48. Pressure line 48 has line 50 connected thereto to deliver pressurized swimming pool water through check valve 52 to inlet line 24. In addition, outlet waterline 32 is connected through a flow control-, metering-, or needle valve 54 in line 56 to suction line 42. With this structure, with the pump running, water is delivered through inlet line 24 to inlet float valve 22. As long as the water level 28 is low, valve 22 is open and the incoming water fills the tank 12 to the normal water level 28. At the same time, since float 34 is below float 26, outlet float valve 30 is open so that water flows through outlet line 32, needle valve 54 and line 56 to the suction side of pump 40. Thus, there is circulation through the tank 12.

Filling funnel 58 is above normal water level 28 and below the open top 18 of tank 12. Filling funnel 58 is connected through drop tube 60 to hood 62. The hood is positioned a small distance, for example several inches, above the closed bottom 14. A solution of about 10 percent sodium hypochlorite in water solution is poured in filling funnel 28. It discharges out lower end 62, which may or may not be formed as a hood. The filling funnel, drop tube and hood are configured so as to minimize or eliminate turbulence in filling so as to prevent the sodium hypochlorite solution from mixing with the swimming pool water in tank 12. The sodium hypochlorite solution is heavier than water and thus tends to stay unmixed at the bottom of the tank. From several gallons to half a tankful of sodium hypochlorite solution can be poured into the tank. When more than a few gallons are poured in, pump 40 should be running so that the excess swimming pool water is withdrawn through outlet line 32. A separate body 64 of material such as sodium hypochlorite in water solution is stratified in the bottom of the tank below the body 66 of swimming pool water in the upper portion of the tank. In view of the separation, the tank 12 is a separation tank.

In operation with the pool pump 40 running, inlet line 24 and inlet valve 22 supply swimming pool water to the upper body in the tank sufficiently to maintain the water level. Outlet valve 30 is open because its float has not descended, and outflow through line 32 is controlled by needle valve 54. The needle valve 54 is provided to control the flow of water through the separation tank. With the water solution of sodium hypochlorite as the separate body in the bottom of the tank, and with the swimming pool water thereabove having a chlorine concentration less than saturation, dissociation of the sodium hypochlorite delivers chlorine in solution to the swimming pool water body 66. It is the flow of this upper body of swimming pool water to the swimming pool which is controlled by needle valve 54. Thus, the rate of inflow of chlorine into the pool is controlled.

It will be appreciated that the volume of flow through pool inlet line 48 is much higher than the flow through separation tank inlet line 24 so that only a small portion of the chlorinated water is recirculated.

It is conventional to run the pump 40 only a portion of the day. When the pump 40 is turned off, water would tend to drain back through lines 24 and 32 to the pool. The drain back through line 24 is prevented by check valve 52, and the drain back through line 32 is prevented by the falling float 34 which closes the valve 30 before outlet water line 32 is exposed. When the pump is next started, the separation tank 12 is refilled to its normal level through pressure inlet line 24. When replenishment of the sodium hypochlorite solution is required, lid 20 can be removed and the new solution poured down funnel 58 at any time. If more than a few gallons are to be added, it is preferable that pump 40 be running in order to draw off the excess water to prevent the tank from overflowing. As previously indicated, the dissociation of sodium hypochlorite leaves sodium chloride. If the separate body of sodium hypochlorite in water solution is maintained stratified in the bottom of separation tank 12, as indicated, the sodium chloride reaches saturated solution condition in the bottom of the tank and sodium chloride precipitates out in the form of granules 68. These will remain out of solution as long as the body 64 is maintained thereabove and will not pass into solution in the pool water 66. After an accumulation of sodium chloride granules has taken place, it may be desirable to drain the tank 12 and remove the sodium chloride precipitate granules from the bottom of the tank. Such is only necessary when the granules build up to a point where the non-turbulent filling of new sodium chloride in water solution becomes difficult. The chlorinator thus continuously provides chlorine in solution to the water in swimming pool 38, as long as the pump is running to provide uniform chlorination. The chlorinator also provides a structure in which sodium hypochlorite can be used in swimming pool chlorination, without delivery of all of the sodium chloride to the pool water.

As to the swimming pool application of the invention as above described, the chlorinator broadly takes the form of an ion-exchange metering device, which is established by producing a dense media bed of undisturbed halogen rich salts (phase #2) and a supernatant media (phase #1) of quiescent flowing liquid. The minute flow of the supernatant is adjusted in such a manner that the halogen rich bed is undisturbed by the quiet lateral flow of the less dense liquid. This lateral flow is altered by the entry into the reservoir and the apparent fallout of spent salts to the halogen rich base layer and the subsequent deposition of the spent salt on the bottom of the vessel. The ion exchange, resulting in the passage of the high density boundary layer, precludes the salts from migrating to the less dense phase; and the accumulation at the lower level of the halogen rich media serves as a desalinyzation function within the chamber and provides an ongoing and continuous exchange of halogens to the less dense media and a deposition of salts beneath the dense media.

The salt particles are enhanced to drop by the pH being slightly acidic. In addition to the ionic exchange of the halogen rich zone, the Brownian movement of the ionized species tends to have a flocculating effect by the decomposition of the halide solution and the ionized surface of the salt. The quiescent properties of the supernatant fluid and the minute electrical and chemical surroundings provide this unique culmination of events to foster the salt flocculation and uniform halogenation of the horizontal flowing liquid of the upper layers of the vessel.

What is provided therefor, for use in a number of arts and contexts, is an elemental dispersion system between two dissimilar fluids for effecting, as a useful result, an impregnated metered fluid flow that can serve any one of a number of purposes.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A swimming pool water treatment unit comprising: a separator tank, said separator tank provided a tank bottom and having a lower portion containing a first body of treatment material in water solution which has a density greater than water and also an upper portion; a quantity of pool water from an external swimming pool disposed in said upper portion and comprising a second body constituted by said pool water, said first and second bodies meeting in continuous contact at an uninterrupted juncture accommodating migration upwardly across said entire juncture of elements of said first body upwardly into said second body; an inlet line connected to said pool and affixed to and communicating into said upper portion of said tank to permit incoming fluid flow to produce disturbance at said juncture wherein to enhance said migration; means associated with said inlet line for controlling the level of water in said separator tank; an outlet line from said upper portion of said tank for connection to said external swimming pool; and externally accessible means having a lower terminal in communication solely with said tank lower portion for non-turbulently delivering the additional placement of a like body of treatment material in water solution directly and solely in said lower portion of said tank.

2. The structure of claim 1 wherein said means for delivering the placement of material in water solution in said lower portion of said tank comprises a drop tube extending from a position above a normal water level in said tank to a position in said lower portion of said tank above said tank bottom.

3. The structure of claim 2 further including a hood secured to the bottom of said drop tube and positioned above the bottom of said tank so as to distribute material in water solution into said bottom portion of said tank.

4. The structure of claim 2 wherein said outlet line from said upper portion of said tank has a valve therein to control flow of said pool water from said upper portion of said tank.

5. The structure of claim 4 wherein said valve is a float valve which closes said outlet line when swimming pool water in the upper portion of said tank decreases to a predetermined level below the normal water level in said tank.

6. The structure of claim 5 wherein said valve comprises a float control valve to control flow rate out of said outlet when said float valve is open.

7. The structure of claim 1 wherein said outlet line from said upper portion of said tank has a valve therein to control flow of said pool water from said upper portion of said tank.

8. The structure of claim 7 wherein said valve is a float valve which closes said outlet line when swimming pool water in the upper portion of said tank decreases to a predetermined level below the normal water level in said tank.

9. The structure of claim 8 wherein said valve comprises a flow control valve to control flow rate out of said outlet when said float valve is open.

10. The structure of claim 1 wherein said body of material in water solution is sodium hypochlorite in water solution which, when so placed in said lower portion of said tank, gives up dissolved chlorine to said pool water in said upper portion of said tank.

11. The structure of claim 10 wherein said separator tank includes means for removing sodium chloride precipitate granules as forms when said sodium hypochlorite in water solution, as it dissociates to deliver chlorine, leaves sodium chloride in said bottom portion of said tank, and said sodium chloride, when it saturates said water solution, precipitates out of solution in the form of granules which remains in the bottom of said tank for later removal.

12. In combination, a swimming pool having swimming pool water and a swimming pool treatment unit; said swimming pool having a circulating pump connected thereto, said circulating pump having a suction line connected to said swimming pool to draw said water from said swimming pool and a pressure line to deliver said water back to said swimming pool, said treatment unit comprising a tank, said tank having an upper portion containing a portion of said swimming pool water, a lower portion, and a tank bottom, said tank upper portion having an inlet float valve, said inlet float valve being connected to said swimming pool pressure line so that as long as said swimming pool pump is running, pressurized swimming pool water is delivered to said inlet float valve, said inlet float valve being arranged to open when water level in said tank decreases to a given level below a maximum water level but above said tank lower portion and closes when the water level reaches said maximum water level; means for non-turbulently delivering a halogen substance in water solution directly and solely into said lower portion of said tank so that said halogen substance in water solution forms a body in said lower portion of said tank; an outlet line from said upper portion of said tank, said outlet line being connected to said suction line between said swimming pool and said swimming pool pump; and means for delivering swimming pool water from said upper portion of said tank to said swimming pool to deliver halogen-treated water to said swimming pool.

13. The combination of claim 12 wherein said outlet line has a control valve therein.

14. The combination of claim 13 wherein said control valve comprises a flow control valve to control the rate of flow of treated water from the upper portion of said tank to said swimming pool pump suction line.

15. The combination of claim 14 further including a treated water outlet float valve, said outlet float valve having a float connected thereto, said float holding said outlet float valve open when water in said tank is at its predetermined water level and closes said outlet float valve when the water level in said tank is between said predetermined water level and the level of said tank outlet line.

16. In combination, a swimming pool and a swimming pool treatment unit; said swimming pool having a circulating pump connected thereto, said circulating pump having a suction line connected to said swimming pool to draw water from said swimming pool and a pressure line to deliver water back to said swimming pool, said treatment unit comprising a tank, said tank having an upper portion, a lower portion, and a tank bottom, said tank having an inlet float valve, said inlet float valve being connected to said swimming pool pressure line so that as long as said swimming pool pump is running, pressurized swimming pool water is delivered to said inlet float valve, said inlet float valve being arranged to open when water level in said tank decreases to a given level below a maximum water level and closes when the water level reaches said maximum water level; means for delivering a halogen substance in water solution into the bottom portion of said tank so that the halogen substance in water solution forms a body in the lower portion of said tank; and means for delivering swimming pool water from the upper portion of said tank to said swimming pool to deliver halogentreated water to said swimming pool, and wherein said means for introducing a halogen substance in water solution into the bottom portion of said tank comprises a drop tube extending from above said maximum water level to a position within said tank above said tank bottom and within said lower portion of said tank, and means lowerly affixed to said drop tube above said tank bottom for substantially non-turbulently delivering said halogen substance in water solution into the bottom portion of said tank.

17. The combination of claim 16 wherein said means for delivering comprises a downwardly directed distributing hood.

18. In combination, a swimming pool and a swimming pool chlorinator, said swimming pool having a circulating pump connected thereto, said circulating pump having a suction line connected to said swimming pool to draw water from said swimming pool and a pressure line to deliver water back to said swimming pool, said chlorinator including a chlorinator tank, said chlorinator tank having an upper portion, a lower portion, and a tank bottom said chlorinator tank having an inlet float valve, said inlet float valve being connected to said swimming pool pressure line so that as long as said swimming pool pump is running, pressurized swimming pool water is delivered to said inlet float valve, said inlet float valve being arranged to open when water level in said chlorinator tank decreases to a given level below a maximum water level and closes when the water level reaches said maximum water level; means for delivering sodium hypochlorite in water solution into the bottom portion of said tank so that sodium hypochlorite in water solution forms a body in the lower portion of said tank; and means for delivering swimming pool water from the upper portion of said tank to said swimming pool to deliver chlorinated water to said swimming pool; wherein said means for introducing a sodium hypochlorite in water solution into the bottom portion of said chlorinated tank comprises a drop tube extending from above said maximum water level to a position within said tank above said tank bottom and within said lower portion of said tank, and means lowerly affixed to said drop tube above said tank bottom for substantially non-turbulently delivering sodium hypochlorite in water solution into the bottom portion of said tank; wherein said means for delivering comprises a downwardly directed distributing hood; and wherein said drop tube extends up through the interior of said tank and there is a funnel attached to the top of said drop tube so that sodium hypochlorite in water solution can be poured into said funnel to descend down said drop tube and spread under said distributor hood to substantially non-turbulently fill sodium hypochlorite in water solution into the bottom portion of said tank where it remains below the swimming pool water and gives up dissolved chlorine to the swimming pool water to chlorinate the swimming pool water as it passes through said chlorinator tank.

19. The combination of claim 18 wherein said means for delivering swimming pool water comprises an outlet line from said upper portion of said tank, said outlet line being connected to said suction line between said swimming pool and said swimming pool pump.

20. The combination of claim 19 wherein said outlet line has a control valve therein.

21. The combination of claim 20 wherein said control valve comprises a flow control valve to control the rate of flow of chlorinated water from the upper portion of said tank to said swimming pool pump suction line.

22. The combination of claim 21 further including a chlorinated water outlet float valve, said outlet float valve having a float connected thereto, said float holding said outlet float valve open when water in said tank is at its predetermined water level and closes said outlet float valve when the water level in said tank is between said maximum water level and the level of said tank outlet line.

23. The combination of claim 18 wherein said chlorinator tank includes means for removing sodium chloride precipitate granules as forms when said sodium hypochlorite in water solution, as it dissociates to deliver chlorine, leaves sodium chlorine in said bottom portion of said tank, and said sodium chloride, when it saturates said water solution, precipitates out of solution in the form of said granules which remain in the bottom of said tank for later removal.

24. A swimming pool water treatment unit comprising: a separator tank, said separator tank provided a tank bottom and having a lower portion containing a first body of treatment material in water solution which has a density greater than water and also an upper portion; a quantity of pool water from an external swimming pool disposed in said upper portion and comprising a second body constituted by said pool water, said first and second bodies meeting in continuous contact at an uninterrupted juncture accommodating migration upwardly across said entire juncture of elements of said first body upwardly into said second body; an inlet line connected to said pool and affixed to and communicating into said upper portion of said tank; means associated with said inlet for controlling the level of water in said separator tank; an adjustable metered outlet from said upper portion of said tank for connection to said external swimming pool; and externally accessible means in lower terminal communication solely with said tank lower portion for non-turbulently delivering the additional placement of a like body of treatment material in water solution directly and solely in said lower portion of said tank.

* * * * *